United States Patent
Keul et al.

(10) Patent No.: US 12,366,741 B2
(45) Date of Patent: Jul. 22, 2025

(54) CONTROL DEVICE FOR A MICROSCOPE

(71) Applicant: LEICA MICROSYSTEMS CMS GMBH, Wetzlar (DE)

(72) Inventors: Oliver Keul, Wetzlar (DE); Volker Schacht, Wetzlar (DE); Kai Ritschel, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 37 days.

(21) Appl. No.: 18/267,117

(22) PCT Filed: Nov. 30, 2021

(86) PCT No.: PCT/EP2021/083519
§ 371 (c)(1),
(2) Date: Jun. 14, 2023

(87) PCT Pub. No.: WO2022/128440
PCT Pub. Date: Jun. 23, 2022

(65) Prior Publication Data
US 2024/0053596 A1  Feb. 15, 2024

(30) Foreign Application Priority Data
Dec. 17, 2020 (EP) .................................... 20214972

(51) Int. Cl.
*G02B 21/36* (2006.01)
*G02B 21/24* (2006.01)
*G02B 21/26* (2006.01)

(52) U.S. Cl.
CPC ......... *G02B 21/365* (2013.01); *G02B 21/242* (2013.01); *G02B 21/26* (2013.01)

(58) Field of Classification Search
CPC ..... G02B 21/365; G02B 21/242; G02B 21/26
(Continued)

(56) References Cited

U.S. PATENT DOCUMENTS 4,945,220 A * 7/1990 Mallory ............... G02B 21/244
250/201.3
5,790,710 A * 8/1998 Price .................... G01N 15/147
250/201.3
(Continued)

FOREIGN PATENT DOCUMENTS

DE  102012021726 A1 * 5/2014 ........... G02B 21/365
JP  H0886965 A  *  4/1996  ............. G02B 21/26
(Continued)

OTHER PUBLICATIONS

Wikipedia, "Digital microscope—Wikipedia," Mar. 2020, pp. 1-5, XP093079472, Retrieved from the Internet: URL:https://web.archive.org/web/20200320000743/https://en.wikipedia.org/wiki/Digital_microscope.

*Primary Examiner* — Marnie A Matt
(74) *Attorney, Agent, or Firm* — LEYDIG, VOIT & MAYER, LTD.

(57) ABSTRACT

A control device for a microscope includes an actuator configured to shift a microscopic field of view relative to a sample, and an operating device configured to be operated by a user to control the actuator in accordance with a response characteristic determining a shift sensitivity. The field of view is shifted relative to the sample in response to a user operation of the operating device. The control device further includes a processor configured to determine a total visual magnification, and to control the response characteristic of the operating device based on the total visual magnification. The field of view is visualized by the microscope to the user based on the total visual magnification.

12 Claims, 2 Drawing Sheets

(58) Field of Classification Search
USPC .......................................................... 348/79
See application file for complete search history.

(56) References Cited

U.S. PATENT DOCUMENTS

| | | | |
|---|---|---|---|
| 7,852,551 B2 | 12/2010 | Hara et al. | |
| 2010/0141752 A1* | 6/2010 | Yamada | G01N 1/312 |
| | | | 345/589 |
| 2012/0026582 A1 | 2/2012 | Okabe et al. | |
| 2012/0104253 A1* | 5/2012 | Tsuneta | H01J 37/263 |
| | | | 250/307 |
| 2012/0120224 A1* | 5/2012 | Zuest | G02B 21/368 |
| | | | 348/79 |
| 2014/0293117 A1* | 10/2014 | Murakami | G02B 21/365 |
| | | | 348/349 |
| 2016/0116725 A1* | 4/2016 | Lin | G02B 6/0001 |
| | | | 359/385 |
| 2018/0143419 A1 | 5/2018 | Bryll et al. | |
| 2018/0164563 A1* | 6/2018 | Fujii | G01B 9/04 |
| 2022/0075172 A1* | 3/2022 | Honegger | G02B 21/025 |

FOREIGN PATENT DOCUMENTS

| | | |
|---|---|---|
| JP | 2012027387 A | 2/2012 |
| JP | 6300606 B2 | 3/2018 |
| WO | WO-2016181508 A1 * | 11/2016 |

\* cited by examiner

CONTROL DEVICE FOR A MICROSCOPE

CROSS REFERENCE TO RELATED APPLICATIONS

This application is a U.S. National Phase application under 35 U.S.C. § 371 of International Application No. PCT/EP2021/083519, filed on Nov. 30, 2021, and claims benefit to European Patent Application No. EP 20214972.0, filed on Dec. 17, 2020. The International Application was published in English on Jun. 23, 2022 as WO 2022/128440 A1 under PCT Article 21(2).

FIELD

Embodiments of the present invention relate to a control device for a microscope. Embodiments of the present invention also relate to a microscope comprising a control device and method for controlling a microscope.

BACKGROUND

In order to find a suitable region of interest (ROI) of a sample, a user of a microscope has to shift a field of view (FOV) imaged by an optical system of the microscope relative to the sample. For this purpose, the microscope usually comprises a stage which can be moved in lateral x and y directions for shifting the observed FOV relative to the sample which is placed on the microscope stage. For moving the microscope stage in x and y directions, an actuator such as a stepping motor is controlled via an operating device which is operated by the user to cause the intended stage movement.

For example, the operating device may be formed by a remote control which is manually operated by the user. While manipulating the operating device, the user simultaneously observes an image of the FOV for instance by looking at a screen of a display device. The FOV shift caused by the user operation translates into a shift of a given sample portion, e.g. an ROI which is observed on the screen. An amount by which the observed ROI moves on the screen due to an FOV shift is determined by a response characteristic of the operating device manipulated by the user. Specifically, the response characteristic of the operating device defines a shift sensitivity according to which the FOV is moved relative to the sample when the user is manipulating the operating device. For example, in a coarse setting mode the response characteristic of the operating device provides a low shift sensitivity, and the FOV is moved by a large distance relative to the sample in response to a predetermined manipulation increment which the user applies to the operating device. In contrast, in a fine setting mode the response characteristic of the operating device provides a high shift sensitivity, and the FOV is moved by a small distance relative to the sample in response to the same manipulation increment.

Apparently, there is a proportional correspondence between the FOV shift on the sample and the ROI shift observed on the screen when the user is manipulating the operating device. Specifically, the FOV shift on the sample translates into an ROI shift on the screen, an amount of the ROI shift being determined by a total visual magnification based on which the FOV is converted into an image which can be observed by the user on the screen. The total visual magnification depends on several magnification factors of the microscope system. More specifically, these magnification factors multiply from the sample along an optical detection path up to the screen of the display device to a value that gives the total visual magnification. The magnification factors may be caused by optical and digital/virtual magnification components, and these components may provide for variable magnifications. For instance, an optical zoom system can be used to enlarge or reduce the size of the FOV which is to be imaged by the microscope. Further, a digital zoom for cropping and enlarging an image captured by a digital camera can be applied. All these variable magnification factors contribute to the total visual magnification based on which the FOV is visualized to the user.

Conventional microscope systems often ignore the fact that the total magnification based on which the sample is visualized to the user can become very large. This applies in particular if a digital or virtual zoom is applied. Therefore, in case of a rapid response characteristic of the operating device, i.e. a low shift sensitivity, x and y movements of the microscope stage may be too coarse to enable the user to visually follow a strongly zoomed ROI on the screen. In other words, there is a risk that an ROI may unexpectedly disappear from the user's view while the user is manipulating the operating device. As a result, handling of the microscope becomes difficult.

SUMMARY

Embodiments of the present invention provide a control device for a microscope. The control device includes an actuator configured to shift a microscopic field of view relative to a sample, and an operating device configured to be operated by a user to control the actuator in accordance with a response characteristic determining a shift sensitivity. The field of view is accordingly shifted relative to the sample in response to a user operation of the operating device. The control device further includes a processor configured to determine a total visual magnification, and to control the response characteristic of the operating device based on the total visual magnification. The field of view is visualized by the microscope to the user based on the total visual magnification.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
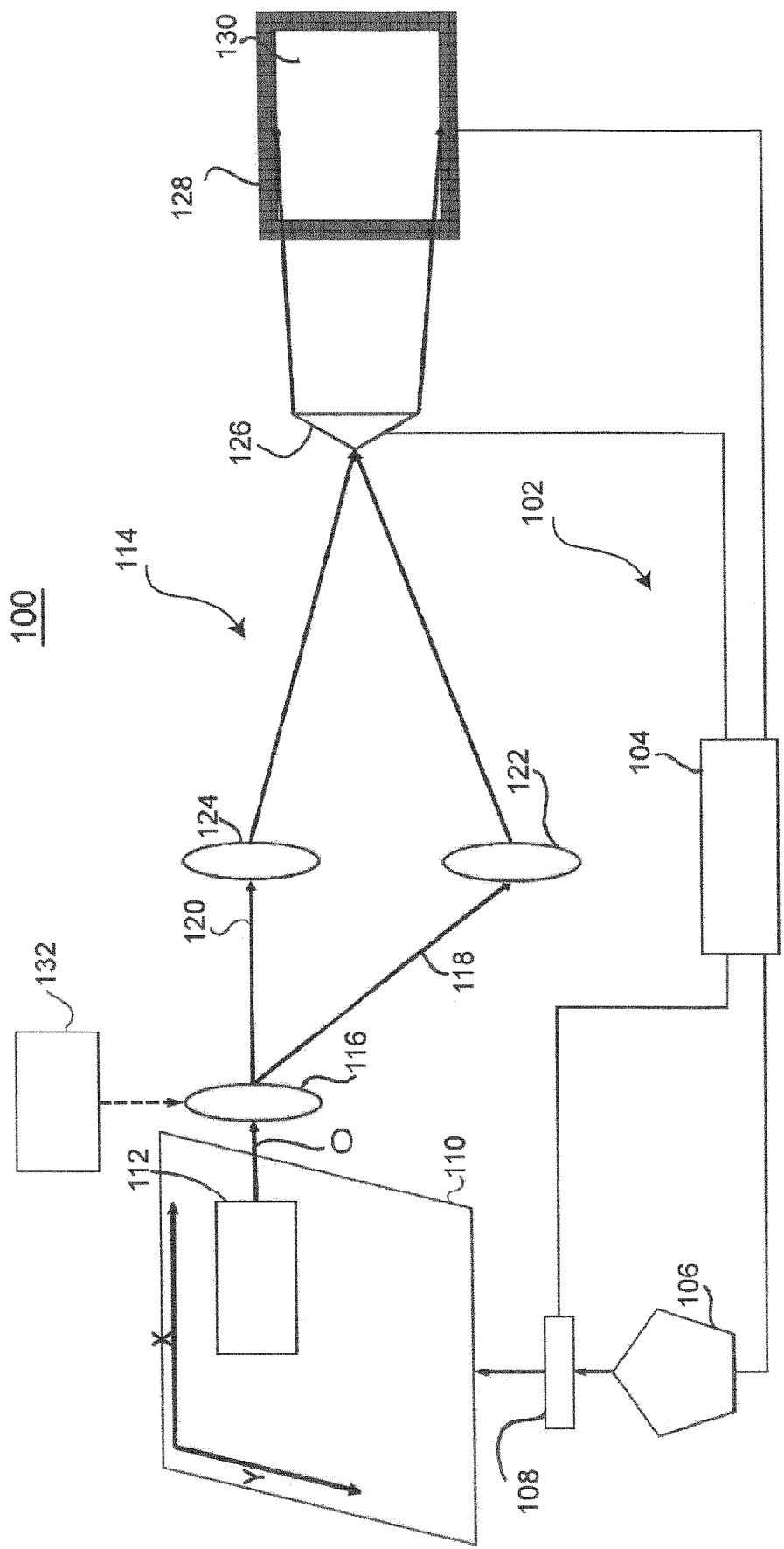
FIG. 1 is a schematic diagram of a microscope comprising a control device according to an embodiment.

Embodiments of the present invention provide a control device and a method for controlling a microscope which enable a user to adjust a microscopic field of view to be imaged more easily and faster.

A control device for a microscope comprises an actuator configured to shift a microscopic field of view relative to a sample, an operating device configured to be operated by a user to control the actuator in accordance with a response characteristic determining a shift sensitivity according to which the field of view is shifted relative to the sample in response to a user operation of the operating device, and a processor configured to determine a total visual magnification based on which the field of view is visualized by the microscope to the user and to control the response characteristic of the operating device based on the total visual magnification.

Hereinafter, the terms magnification and zoom are to be understood in a broad sense, and these terms are used interchangeably. In any case, the term zoom refers to a magnification which can be varied, be it optically or digitally. Thus, in the field of optics, one might understand magnification and zoom in a narrow sense as referring to a system which includes optical elements, these elements being characterized by their optical parameters such as refractive powers, focal lengths, etc. Based on such an understanding, magnification and zoom would be defined by the optical parameters of the systems. However, while the present disclosure certainly covers such optical systems, it is by no means restricted thereto. In particular, the disclosure shall also cover magnification and zoom functionalities which are commonly referred to as digital or virtual magnification/zoom. For instance, in contrast to an optical zoom, a digital or virtual zoom may relate to means for cropping and enlarging an image captured by a digital camera in order to emulate the effect of a smaller or larger focal length of an optical zoom lens. The same effect can be achieved by using digital image processing to crop the digital image for enlarging the cropped image area which is displayed on a screen of a display device.

The control device enables a response characteristic of the operating device to be automatically adapted to a current total visual magnification based on which the image of the field of view (FOV) is visualized to the user. Thus, it is easier for the user to visually follow an imaged sample region of interest (ROI) when the user manipulates the operating device for shifting the FOV across the sample.

In conventional microscopes, a user manipulation of the operating device translates into a FOV shift on the sample in accordance with a constant conversion factor. In other words, the conversion factor remains the same regardless of whether the total visual magnification is high or low. If the total visual magnification is high, the ROI shift on the screen caused by a user manipulation may be too large to enable the user to visually follow the imaged ROI on the screen. On the other hand, if the total visual magnification is low, the ROI shift may be too small to render a visual ROI search efficient. In contrast, the control device disclosed herein allows to apply a conversion factor which is automatically adapted to the total visual magnification which is currently used for imaging the sample. Thus, a zoom scaled FOV shift is achieved which allows highly efficient ROI search on the screen.

It is to be noted that the control device allows an automatic adaption of the response characteristic of the operating device to the current total visual magnification while the microscope is operating. Thus, observing the image on the screen is very convenient and intuitive, and the user is free to concentrate exclusively on a specific task without being distracted by visual disturbances.

The control device can be applied to any type of microscope, e.g. a widefield microscope, a confocal microscope, or a combination thereof.

Preferably, the total visual magnification represents a relationship between a size of an image displayed on a display device of the microscope and a size of the field of view. While in the past microscopes usually used eyepieces for observing a sample, nowadays digital display devices such as monitors are widely used for image observation. Such display devices often provide digital zoom functions which may influence the total visual magnification to a large extent. The control device allows to compensate for adverse effects caused by a highly variable digital zoom when visualizing the sample during an FOV movement relative to the sample.

The processor may be configured to obtain an optical magnification and/or a digital magnification and to determine the total visual magnification based thereon. Any combination of optical magnification and digital magnification can be dealt with efficiently to facilitate the handling of the microscope during an ROI search.

The processor may further be configured to obtain the optical magnification in accordance with a variable focal length of an optical zoom system of the microscope. If a zoom factor is large, it is beneficial to automatically adapt the response characteristic and thus the shift sensitivity with which the FOV is moved relative to the sample.

Preferably, the processor is configured to obtain the optical magnification in accordance with a focal length of an objective of the microscope, said objective being part of an objective changing system comprising a plurality of objectives with different focal lengths. In such a case, a set of objectives usually cover a wide range of available focal lengths so that the total visual magnification varies to a large extent depending on which objective is currently used. Therefore, it is a significant advantage to automatically adapt the response characteristic of the operating device to the total visual magnification.

The processor may be configured to obtain the optical magnification in accordance with a magnification of an optical camera mount system of the microscope. Such a mount system is utilized to couple a camera to the microscope. Taking into account the magnification of the mount system allows to compensate for significant changes in the total visual magnification that would otherwise make an observation during the FOV shift difficult.

In a preferred embodiment, the processor is configured to obtain the optical magnification in accordance with a variable scanning parameter of a confocal detection system of the microscope. The scanning parameter defines the size of the field of view which is scanned by the confocal detection system. Thus, it is possible to take into account a confocal zoom which may be implemented by suitably controlling a scanner included in the confocal detection system.

The processor may be configured to control the response characteristic such that the shift sensitivity varies monotonically depending on the total visual magnification. Preferably, the response characteristic varies linearly with the total visual magnification without being limited thereto. Thus, the processor may also be configured to control the response characteristic such that the shift sensitivity varies non-linearly as a function of the total visual magnification, for example exponentially. If e.g. the total visual magnification becomes very high during operation of the microscope, an exponential decrease of the response characteristic allows to reduce the FOV shift drastically so that the user is still enabled to visually follow an ROI on the screen.

Preferably, the actuator is configured to move a microscope stage holding the sample relative to an optical imaging system of the microscope to shift the field of view relative to the sample. Alternatively, the actuator may move an optical imaging system of the microscope relative to the stage.

The actuator may be configured to move the microscope stage perpendicular to an optical axis of the optical imaging system.

An embodiment according to another aspect provides a microscope which comprises a control device as described herein.

According to another aspect, a method for controlling a microscope is provided, wherein the microscope comprises an actuator configured to shift a microscope field of view relative to a sample, and an operating device configured to be operated by a user to control the actuator in accordance with a response characteristic determining a shift sensitivity according to which the field of view is shifted relative to the sample in response to the user operation of the operating device. The method comprises the following steps: determining a total visual magnification based on which the field of view is visualized by the microscope to the user; and controlling the response characteristic of the operating device based on the total visual magnification.

FIG. 1 shows a diagram of a microscope 100 according to an embodiment.

According to the embodiment shown in FIG. 1, the microscope 100 is configured to combine widefield and confocal imaging. However, a configuration as shown in FIG. 1 is to be understood merely an example. Any other suitable type of microscope can be used to provide a microscope control as explained hereinafter.

The microscope 100 provides two operating modes which can be selectively activated to perform either widefield imaging or confocal imaging. For the sake of simplicity, FIG. 1 is purely schematic and illustrates components of the microscope 100 in a relatively abstract manner that allows an operating principle to be explained in the present context. In particular, FIG. 1 does not detail specific configurations e.g. in terms of illumination and detection means which may be used to implement combined widefield and confocal imaging.

The microscope 100 comprises a control device generally referred to as 102 in FIG. 1. The control device 102 comprises a processor 104, an operating device 106, and an actuator 108. The operating device 106 may be formed by a remote control which is manually operated by a user as described hereinafter. The actuator 108 is coupled to the operating device 106 and may comprise e.g. a motorized driving unit such as a stepping motor coupled to drive axes etc. without being limited thereto.

The microscope 100 may further comprise a microscope stage 110 on which a sample 112 is located. The microscope stage 110 is movable in lateral x and y directions which define a plane parallel to a stage surface on which the sample 112 is held.

The microscope 100 may further comprise an optical imaging system 114 which serves both for widefield and confocal imaging of the sample 112. An optical axis O of the optical imaging system 114 is perpendicular to the x and y directions along which the microscope stage 110 is movable by means of the actuator 108. According to the present embodiment, the optical imaging system 104 includes an objective 116 facing the sample 112. The objective 116 forms a detection lens for shared use in both operating modes, i.e. widefield and confocal imaging. In addition to the objective 116, the optical imaging system 114 may comprise further optical components (not shown in FIG. 1) for shared use in the widefield mode and the confocal mode. Further, the optical imaging system 114 may also include optical components which are exclusively used either in the widefield mode or in the confocal mode. This is illustrated in FIG. 1 by two spatially separated optical paths 118 and 120, one of which being assigned to widefield imaging and the other being assigned to confocal imaging. Accordingly, the optical path 118 represents a widefield detection system, and the optical path 120 represents a confocal detection system. For simplicity, the widefield detection system and the confocal detection system are represented hereinafter by the optical paths 118 and 120, respectively.

Among the optical components which are included in the widefield detection system 118, an optical camera mount system 122 may be provided. Further, the widefield detection system 118 includes a 2D image sensor whereas the confocal detection system 120 comprises a confocal point sensor. Typically, the afore-mentioned sensors are spatially separated sensor units which are located at different positions within the optical imaging system 114. However, it may also be envisaged to use a single sensor unit both for widefield and confocal detection. For instance, a widefield camera may also be used for confocal detection. Just for simplicity, FIG. 1 shows a single sensor unit 126 which can be understood as being formed either by one sensor or by two sensors.

The confocal detection system 120 may further comprise a scanner which is shown schematically as element 124 in FIG. 1. The scanner 124 is used to scan illumination light along the x and/or y direction across the sample 112. As principally known in confocal microscopy, the scanner 124 also serves to descan the detection light emerging from the sample 112 so that the detection light, although caused by a spatial scan across the sample 112, can be received by a stationary point sensor if desired.

The microscope 100 shown in FIG. 1 comprises a display device 128 having a screen 130. The display device 128 is configured to display an image of the sample 112 on its screen 130. The image displayed on the screen 130 corresponds to a field of view (FOV) from which detection light is collected from the sample 112 through the objective 116 of the optical imaging system 114.

The imaged FOV displayed on the screen 130 can be shifted by the user relative to the sample 112 by means of the operating device 106. For this purpose, the user manipulates the operating device 106, and the operating device 106 outputs a control signal corresponding to the user manipulation to the actuator 108. Just as an example, the operating device may be formed by a manipulation unit of a joystick type which is connected to the processor 104 and the actuator 108. In such a case, the user may swivel a manipulation stick of the operating device 106, and a corresponding control signal is output to the actuator 108. Thus, the actuator 108 moves the microscope stage 110 in the x-y plane in response to a user manipulation of the operating device 106 so that the FOV which is imaged by the optical imaging system 114 is correspondingly shifted relative to the microscope stage 110. As a result, the FOV is laterally moved relative to the sample 112 which is stationary with respect to the microscope stage 110. It is to be noted that any other type of operating device, which enables the user to shift the FOV relative to the sample 112, may be used.

An amount by which the FOV is moved relative to the sample 112 depends on a response characteristic according to which the operating device 106 responds to a user manipulation. The response characteristic determines a distance by which the microscope stage 110 is moved in x and/or y by means of the actuator 108 when the user manipulates the operating device 106 with a given increment. For instance, if the user manipulates the operating device 106 with a predetermined unit increment A which translates into a unit motion of the microscope stage 108 by distance B, the response characteristic can be defined by a conversion factor B/A. Thus, an arbitrary manipulation of the operating device 106 in the amount C translates into a stage motion distance that equals C times the conversion factor B/A.

In case that the conversion factor is large, the operating device 106 has a rapid response characteristic, i.e. a low shift sensitivity, and a predetermined user manipulation of the operating device 106 causes an FOV shift on the sample 112 by a relatively large distance. In contrast, if the conversion factor is small, the operating device 106 has a slow response characteristic, i.e. a high shift sensitivity, and the user manipulation of the operating device 106 causes an FOV shift on the sample 112 by relatively small distance.

An FOV shift relative to the sample 110 that is caused by manipulating the operating device 106 translates into a shift of a given sample region, for example a region of interest (ROI) which is imaged by the optical imaging system 114 and observed by the user on the screen 130 of the display device 128. As mentioned above, an amount of the FOV shift on the sample 112 depends on the response characteristic of the operating device 106. Accordingly, an amount of the ROI shift on the screen 130 depends on the response characteristic of the operating device 106 likewise, and the distance by which the ROI is moving on the screen 130 corresponds with the distance by which the FOV moves relative to the sample.

The proportionality between the FOV shift on the sample 112 and the ROI shift on the screen 130 is determined by a total visual magnification based on which the FOV is converted by the optical imaging system 114 into the image which is displayed on the screen 130 and observed by the user while manipulating the operating device 106. The total visual magnification represents a relationship between the size of the image which is displayed on the screen 130 and the size of the FOV on the sample 112. The total visual magnification may depend on a plurality of magnification factors which become effective in the microscope 100 when imaging the sample 112. These magnification factors may be at least partially different depending on whether the widefield mode or the confocal mode is selected.

In the widefield mode three magnification factors may multiply to the total visual magnification along the optical detection path from the sample 112 up to the screen 130 where the image is finally observed by the user. Firstly, the objective 116 (possibly in combination with additional optical elements of the widefield detection system 118 which are not shown in FIG. 1) may form an optical zoom system. A focal length of the optical zoom system can be varied between a minimum value and a maximum value. A current focal length which is set between minimum and maximum defines a (variable) first magnification factor. Secondly, the widefield detection system 118 may comprise the afore-mentioned camera mount system 122 which may provide a predetermined magnification, e.g. 0.6× defining a (fixed) second magnification factor. Thirdly, a digital or virtual zoom may be provided. For instance, if the image sensor 126 is formed by a digital 2D camera, only a part of an active image sensor area of the camera may be used for providing image data based on which the image is displayed on the screen 130 of the display device 128. Additionally or alternatively, a digital zoom can also be achieved by post-processing of the image data which is output from the image sensor 126 to the display device 128. In any case, the digital zoom defines a (variable) third magnification factor.

According to this example, the afore-mentioned first, second, and third magnification factors multiply to the total visual magnification in the confocal mode. Since some of the magnification factors may depend on the current zoom setting of the associated optical and/or digital zoom components, the total visual magnification varies with the current zoom setting. Accordingly, the proportionality between the FOV shift on the sample 112 and the ROI shift on the screen 130 varies in accordance with the variable total visual magnification in the widefield mode.

Correspondingly, in the confocal mode, three magnification factors may multiply to the total visual magnification along the optical detection path from the sample 112 up to the screen 130 where the image is finally observed by the user. Firstly, the objective 116 (possibly in combination with additional optical elements of the confocal detection system 120 which are not shown in FIG. 1) may form an optical zoom system. Again, a focal length of the optical zoom system can be varied between minimum and maximum, and a current focal length set between minimum and maximum defines a (variable) first magnification factor. Secondly, the confocal mode may provide a so-called confocal zoom that is implemented by means of the scanner 124 included in the confocal detection system 120. As mentioned above, the scanner 124 is used to move the illumination light across the sample 112. At the same time, the scanner 124 is configured to descan the detection light emerging from the sample 112. Accordingly, the size of the FOV on the sample 112 is determined by a scan area on the sample 112 which is covered by the scanner 124 wherein the number of pixels per captured FOV remains the same. Thus, a scanning parameter based on which the scanner 124 is controlled determines a (variable) second magnification factor. Thirdly, a digital or virtual zoom may be provided, for example by post-processing the image data which is output from the image sensor 126 to the display device 128 in the confocal mode. The digital zoom defines a (variable) third magnification factor.

Thus, the first, second, and third magnification factors multiply to the total visual magnification in the confocal mode. Some of the magnification factors may depend on the current zoom setting of the associated optical and/or digital zoom components so that the total visual magnification varies with the current zoom setting. As a result, the proportionality between the FOV shift on the sample 112 and the ROI shift on the screen 130 varies also in the confocal mode in accordance with the variable total visual magnification.

It is to be emphasized that the afore-mentioned magnification factors are merely examples. Any type of magnification and zoom configuration which takes influence on the total visual magnification on the screen 130 or on any other visualization means such as an eyepiece can be suitably considered. For instance, the objective 114 may be part of an objective changing system (schematically shown as block 132 in FIG. 1) comprising a plurality of lenses with different focal lengths. By interchanging the lenses, the respective magnification factor changes correspondingly.

Figure 2:
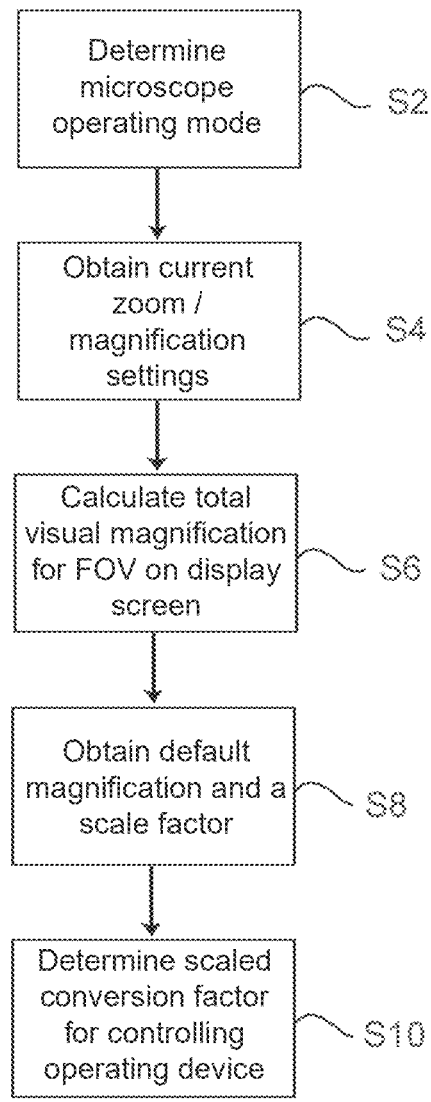
FIG. 2 is a flow diagram illustrating a method for controlling the microscope according to an embodiment.

Hereinafter, an operating principle of the control device 102 is explained by way of the example shown in FIG. 1. Thereby, reference is made to a flow diagram in FIG. 2 illustrating a method for controlling the microscope 100.

In step S2, the processor 104 of the control device 102 determines an operating mode of the microscope 100. In particular, it is determined whether the widefield mode or the confocal mode is selected.

In step S4, the processor obtains information on the current zoom/magnification setting of the microscope 100 in the respective operating mode. In particular, the processor 104 obtains several magnification factors as explained above. In case of variable magnifications, the magnification factors may be related both to optical and digital/virtual zoom components. Also fixed magnifications may be taken into account, for instance in case that the microscope 100 uses the objective changing system 132 which comprises a plurality of objectives having fixed focal lengths. The information on the respective magnification factors may be stored in advance in a memory of the control device 102 (in particular in case of fixed magnifications), and/or the information may be read out from the respective magnifying component during operation (in particular in case of variable magnifications).

In step S6, the processor 104 uses the magnification factors obtained in S4 to calculate the total visual magnification based on which the FOV is displayed on the screen 130 of the display device 128. In the present example, the processor 104 multiplies three magnification factors provided in the respective operating mode, and the result of multiplication is the total visual magnification.

In step S8, the processor 104 obtains a total default magnification which may be a product of several predetermined default magnification factors. For example, these default magnification factors may comprise all fixed magnifications, i.e. all magnifications which are not changed by zooming. With regard to magnifications which are varied by zoom operations, specific default values within the respective zoom range may be taken into account when determining the total default magnification. Further, not all magnifications which take influence on the total visual magnification need to be taken into account to calculate the total default magnification at this stage. For example, in the confocal mode the confocal zoom implemented by the scanner 124 may be disregarded when determining the total default magnification. Subsequently, the processor 104 determines a scale factor S by calculating the ratio of the default magnification and the total visual magnification obtained in S6.

In step S10, the processor 104 multiplies the original conversion factor B/A with the scale factor S so that a scaled conversion factor is obtained. The scaled conversion factor may be stored in a memory of the operating device 106. From this point on, the actuator 108 is controlled in response to a user manipulation of the operating device 106 in accordance with a control signal which takes into account the scaled conversion factor rather than the initial conversion factor. In other words, the response characteristic of the operating device 106 is changed according to the scaled conversion factor.

If the total default magnification is larger than the total visual magnification, the scale factor S is larger than 1, and the scaled conversion factor is larger than the original conversion factor. In this case, the response characteristic of the operating device 106 becomes faster, and a predetermined user manipulation of the operating device 106 causes a larger FOV shift on the sample 112. Thus, the ROI shift that the user observes on the screen 130 when manipulating the operating device 106 becomes larger likewise.

Correspondingly, if the total default magnification is smaller than the total visual magnification, the scale factor S is smaller than 1, and the scaled conversion factor is smaller than the original conversion factor. Therefore, the response characteristic of the operating device 106 becomes slower, and a predetermined user manipulation of the operating device 106 causes a smaller FOV shift on the sample 112. Thus, the ROI shift that the user observes on the screen 130 when manipulating the operating device 106 becomes smaller.

As a result, the response characteristic of the operating device 106 can be automatically adapted to the current total visual magnification so that it is easier for the user to observe the image on the screen 109 while manipulating the operating device 106.

According to the embodiment described above, the scale factor S is calculated such that the response characteristic varies linearly with the total visual magnification. However, this is merely an example. The scale factor can also be determined so that the response characteristic of the operating device 106 is varied non-linearly, e.g. exponentially with the total visual magnification.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 microscope
102 control device
104 processor
106 operating device
108 actuator
110 microscope stage
112 sample
114 optical imaging system 116 objective
118 optical path/widefield detection system
120 optical path/confocal detection system
122 optical camera system
124 scanner
126 image sensor
128 display device
130 screen
132 objective changing system

The invention claimed is:

1. A control device for a microscope, the control device comprising:
  an actuator configured to shift a microscopic field of view relative to a sample,
  an operating device configured to be operated by a user to control the actuator in accordance with a response characteristic determining a shift sensitivity according to which the field of view is shifted relative to the sample in response to a user operation of the operating device, and
  a processor configured to:
    obtain an optical magnification in accordance with a variable scanning parameter of a confocal detection system of the microscope, the scanning parameter defining a size of the field of view that is scanned by the confocal detection system;
    determine a total visual magnification based on the optical magnification, wherein the field of view is visualized by the microscope to the user based on the total visual magnification, and
    control the response characteristic of the operating device based on the total visual magnification.

2. The control device according to claim 1, wherein the processor is further configured to obtain a digital magnification, and to determine the total visual magnification further based on the digital magnification.

3. The control device according to claim 1, wherein the processor is configured to obtain the optical magnification further in accordance with a variable focal length of an optical zoom system of the microscope.

4. The control device according to claim 1, wherein the processor is configured to obtain the optical magnification further in accordance with a focal length of an objective of the microscope, the objective being part of an objective changing system comprising a plurality of objectives with different focal lengths.

5. The control device according to claim 1, wherein the total visual magnification indicates a ratio of a size of an image displayed on a display device of the microscope to a size of the field of view.

6. The control device according to claim 1, wherein the processor is configured to control the response characteristic such that the shift sensitivity varies monotonically as a function of the total visual magnification.

7. The control device according to claim 1, wherein the processor is configured to control the response characteristic such that the shift sensitivity varies linearly or exponentially as a function of the total visual magnification.

8. The control device according to claim 1, wherein the actuator is configured to move a microscope stage holding the sample relative to an optical imaging system of the microscope to shift the field of view relative to the sample.

9. The control device according to claim 8, wherein the actuator is configured to move the microscope stage perpendicular to an optical axis of the optical imaging system.

10. A microscope comprising a control device according to claim 1.

11. A method for controlling a microscope, the microscope comprising an actuator configured to shift a microscopic field of view relative to a sample, and an operating device configured to be operated by a user to control the actuator in accordance with a response characteristic determining a shift sensitivity according to which the field of view is shifted relative to the sample in response to a user operation of the operating device, the method comprising:
  obtain an optical magnification in accordance with a variable scanning parameter of a confocal detection system of the microscope, the scanning parameter defining a size of the field of view that is scanned by the confocal detection system,
  determining a total visual magnification based on the optical magnification, wherein the field of view is visualized by the microscope to the user based on the total visual magnification, and
  controlling the response characteristic of the operating device based on the total visual magnification.

12. A control device for a microscope, the control device comprising:
  an actuator configured to shift a microscopic field of view relative to a sample,
  an operating device configured to be operated by a user to control the actuator in accordance with a response characteristic determining a shift sensitivity according to which the field of view is shifted relative to the sample in response to a user operation of the operating device, and
  a processor configured to:
    obtain an optical magnification in accordance with a variable scanning parameter of a confocal detection system of the microscope, the scanning parameter defining a size of the field of view that is scanned by the confocal detection system,
    obtain a digital magnification,
    determine a total visual magnification based on the optical magnification and the digital magnification, wherein the field of view is visualized by the microscope to the user based on the total visual magnification, and
    control the response characteristic of the operating device based on the total visual magnification.

* * * * *